(12) United States Patent
Dolezal et al.

(10) Patent No.: US 6,757,036 B1
(45) Date of Patent: Jun. 29, 2004

(54) METHOD AND APPARATUS FOR A DUAL SIDED LIQUID CRYSTAL DISPLAY

(75) Inventors: Anthony James Dolezal, West Palm Beach, FL (US); Mark Richard Malon, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/517,116

(22) Filed: Mar. 7, 2000

(51) Int. Cl.[7] ............................................. G02F 1/1335
(52) U.S. Cl. ........................ 349/113; 349/114; 349/96
(58) Field of Search ................................ 349/114, 113, 349/96; 345/103, 1

(56) References Cited

U.S. PATENT DOCUMENTS

| | | | | |
|---|---|---|---|---|
| 5,115,228 A | * | 5/1992 | Harris et al. ............... | 345/75.1 |
| 5,663,816 A | | 9/1997 | Chen et al. | |
| 5,790,214 A | * | 8/1998 | Park ............................. | 349/69 |
| 5,808,711 A | | 9/1998 | Suppelsa et al. | |
| 5,856,819 A | * | 1/1999 | Vossler ........................ | 345/102 |
| 5,963,280 A | * | 10/1999 | Okuda et al. ................. | 349/65 |
| 6,132,048 A | * | 10/2000 | Gao et al. .................... | 353/20 |

* cited by examiner

Primary Examiner—Kenneth Parker
(74) Attorney, Agent, or Firm—Randi L. Dulaney

(57) ABSTRACT

An electronic device (20) includes a liquid crystal display (10) capable of being viewed from opposing sides. The display includes a liquid crystal display glass layer (2) selectively coated with a polarizer layer (4) and a transflective layer (6) on portions of a first viewable side (3) and selectively coated with another polarizer layer (7) and another transflective layer (5) on an opposing second viewable side (8) of the liquid crystal display glass layer such that the respective polarizer layers and transflective layers would oppose each other on the opposing sides of the liquid crystal display glass layer. Additionally, the device includes a liquid crystal display driver (18) capable of generating images on opposing sides of the liquid crystal display.

19 Claims, 4 Drawing Sheets

METHOD AND APPARATUS FOR A DUAL SIDED LIQUID CRYSTAL DISPLAY

FIELD OF THE INVENTION

The present invention is directed to liquid crystal displays, and more particularly to liquid crystal displays viewable from opposing sides.

BACKGROUND OF THE INVENTION

Electronic products are providing consumers with more information than ever before. Cost and design particularly drive portable electronic products in the consumer segment. Some portable electronic products such as cellular phones are now beginning to see multiple liquid crystal displays (LCDs) on one product. An example of this is the Nokia 9000 Series phone which uses two LCDs on opposing sides of a flip or lid. The use of multiple LCDs adds cost and complexity to a product. Typically, two independent liquid crystal displays would require separate glass, LCD drivers and possibly other components. Thus, a need exists for a single LCD that can be viewable from opposing sides that would enable part reductions in products requiring such opposing views.

DETAILED DESCRIPTION

Figure 1:
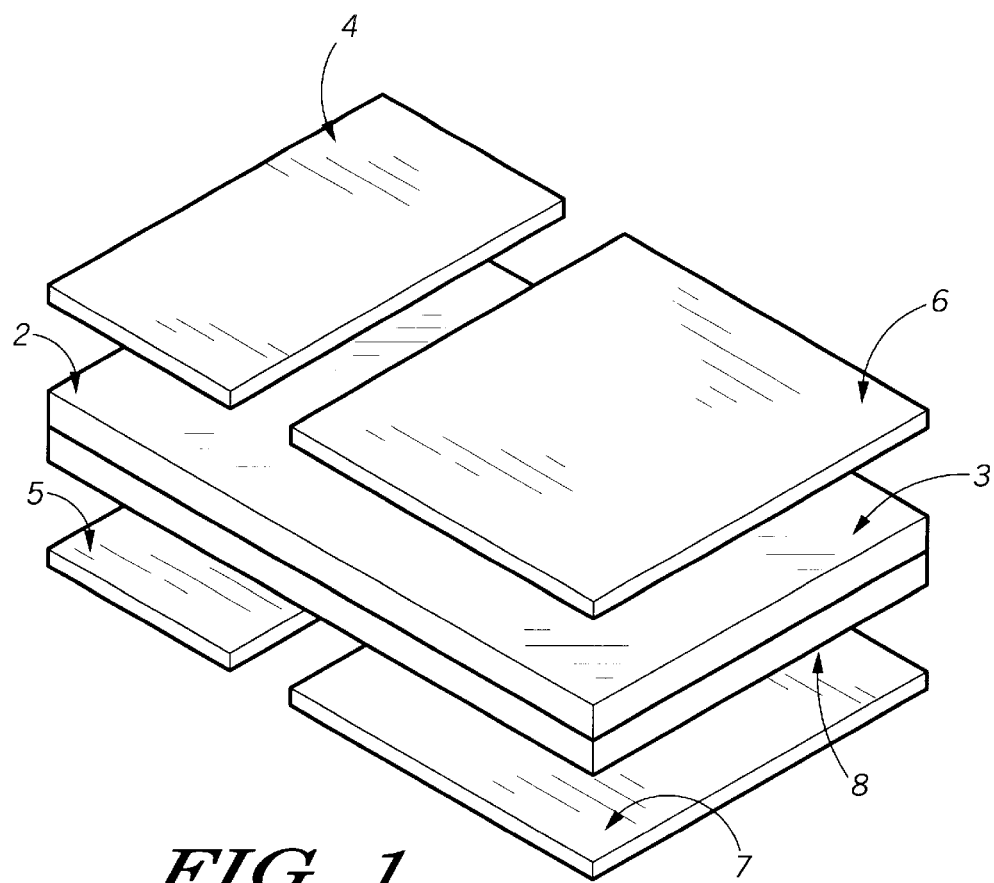
FIG. 1 is an exploded perspective view of a liquid crystal display formed in accordance with present invention.

Referring to FIG. 1, an exploded perspective view of a liquid crystal display 10 formed in accordance with present invention is shown. The LCD 10 is capable of being viewed from opposing sides and preferably comprises a liquid crystal display glass layer 2 with at least a first portion of a first viewable side 3 of the glass layer covered with a polarizer layer 4 and at least a second portion of the first viewable side covered with a layer that reflects a substantial portion of light coming from an opposing side (8) such as a transflective layer 6. The liquid crystal display glass layer can be constructed conventionally from two separate glass layers as shown and the transflective and polarizer layers can be made of film layers. The liquid crystal display glass layer 2 also has at least a first portion of a second viewable side 8 of the glass layer covered with a layer that reflects a substantial portion of light coming from side 3 such as a transflective layer 5 and at least a second portion of the second viewable side 8 covered with a polarizer layer 7, wherein the polarizer layer 4 of the first viewable side correspondingly opposes the transflective layer 5 of the second viewable side and the transflective layer 6 of the first viewable side correspondingly opposes the polarizer layer 7 of the second viewable side. It should be noted that a viewable area of the first viewable side 3 could be of the same dimensions or of different dimensions from a viewable area of the second viewable side 8. If holographic effects are desired on either or both sides of the liquid crystal display, a holographic film layer can replace the transflective layer on the first viewable side and/or the second viewable side as desired. Furthermore, it should be noted that corresponding reflective layers could replace the transflective layers 6 and 5 and still be within the scope of the present invention. In essence, a reflective layer would reflect all of the light shining through an opposing side of an LCD glass, whereas a transflective layer would reflect most of the light shining through an opposing side and still allow for the ability to backlight an LCD glass. Thus, for purposes of the present invention, the term "transflective" shall mean a layer that reflects at least a substantial portion of light coming from an opposing side. Accordingly, a "reflective layer" or a "holographic layer" would be within the scope of a claim reciting a transflective layer.

Figure 2:
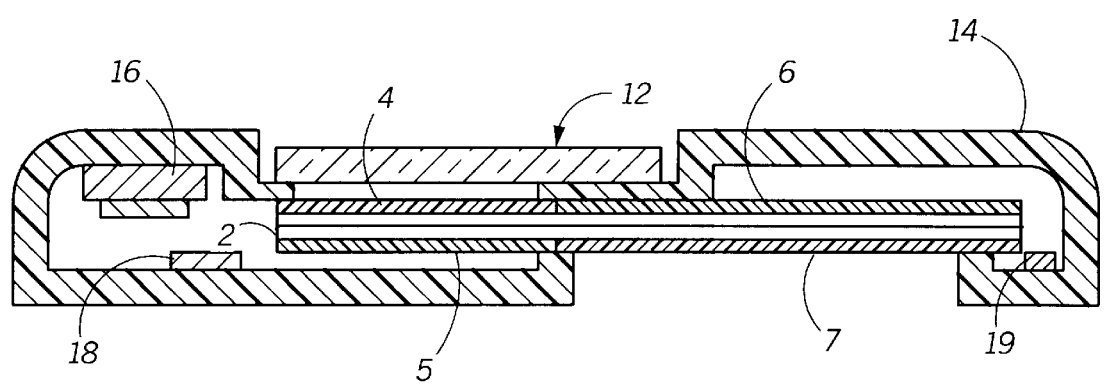
FIG. 2 is a cut view of a flip portion of an electronic product utilizing a single liquid crystal display viewable from opposing sides in accordance with the present invention.
Figure 3:
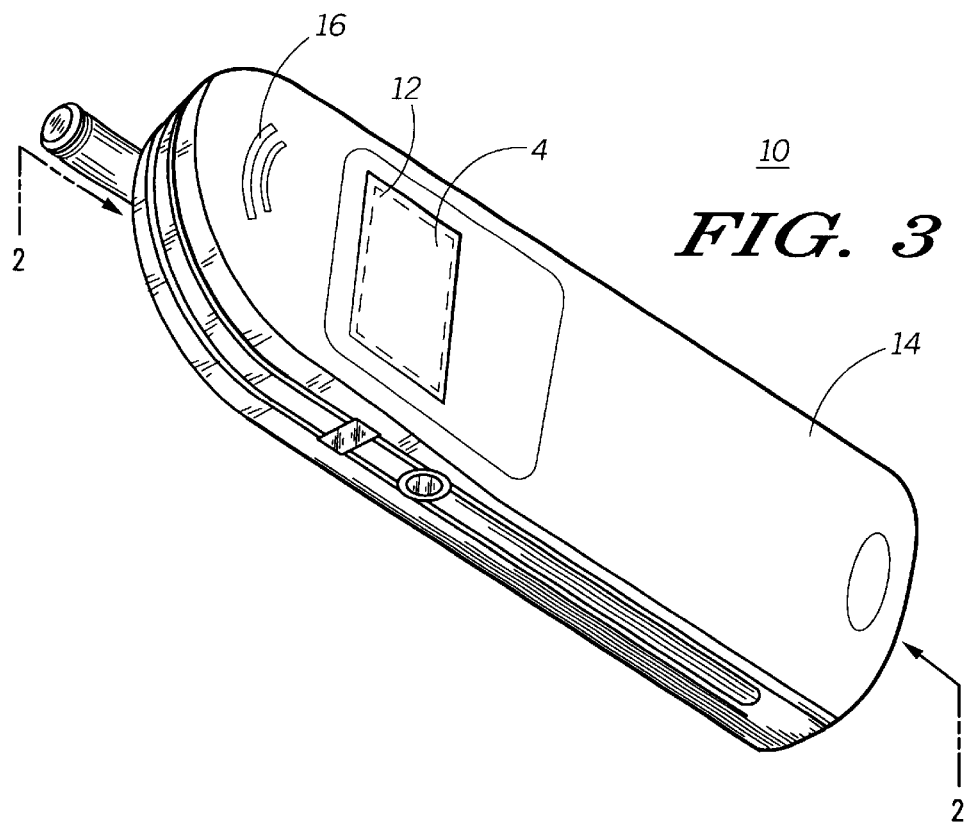
FIG. 3 is a top perspective view of the electronic product with its flip closed illustrating one of the viewable sides of the liquid crystal display in accordance with the present invention.
Figure 4:
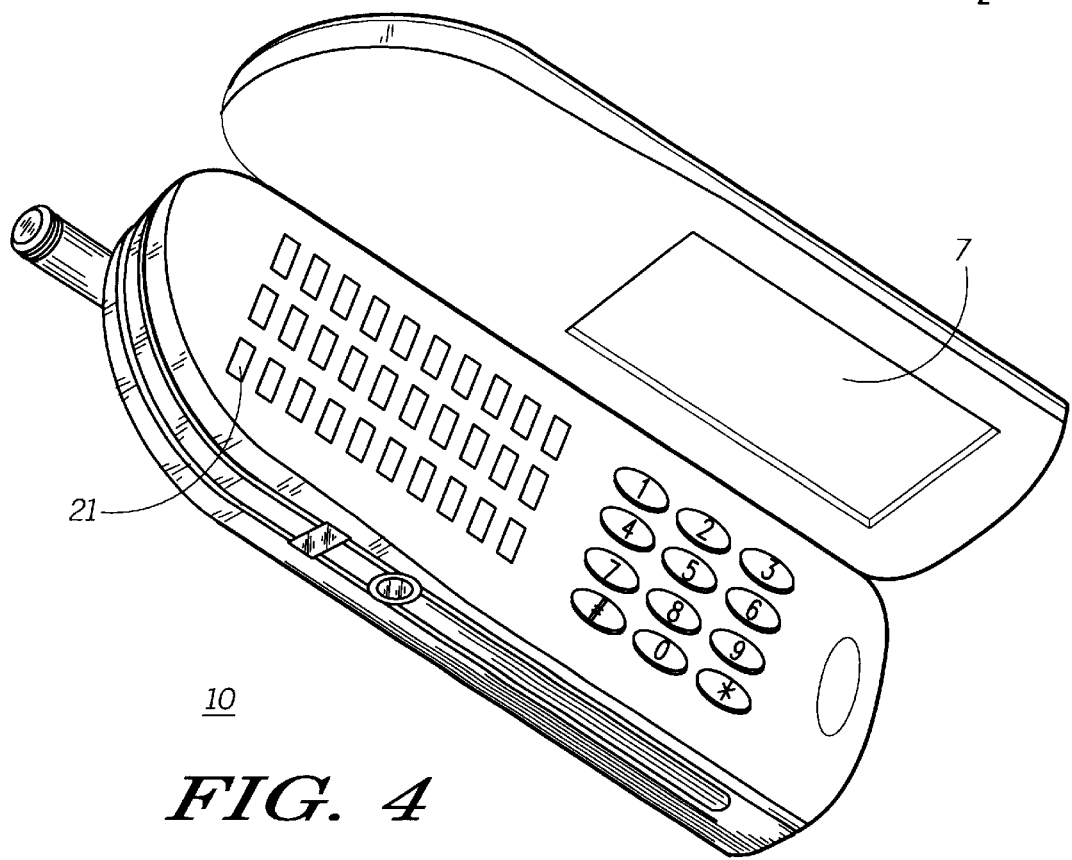
FIG. 4 is another top perspective view of the electronic product of FIG. 3 with its flip opened illustrating an opposing viewable side of the liquid crystal display in accordance with the present invention.

Referring to FIGS. 2, 3, and 4, an electronic device 20 is shown having a liquid crystal display capable of being viewed from opposing sides in accordance with the present invention is shown. The electronic device is preferably a cellular phone, computer laptop, personal digital assistant or other product benefiting from a LCD viewable from opposing sides. Such other products could include cash registers, clocks, electronic books, televisions, and electronic games. The electronic device may also be any of the aforementioned products having an LCD which is viewable on opposing sides of a flip portion of such products. Again, the LCD portion of the electronic product should preferably comprise a liquid crystal display glass layer 2 selectively coated with a polarizer layer 4 and a transflective layer 6 on portions of a first viewable side 3 of the liquid crystal display glass layer 2 and selectively coated with another polarizer layer 7 and another transflective layer 5 on an opposing second viewable side 8 of the liquid crystal display glass layer, wherein the respective polarizer layers and transflective layers would oppose each other on the opposing sides of the liquid crystal display glass layer. The electronic product should also comprise at least one liquid crystal display driver 18 for generating images on opposing sides of the liquid crystal display. Optionally, the electronic device may include at least a second liquid crystal display driver 19 for generating images on an opposing side of the display being driven by driver 18 as shown in FIG. 2. The electronic product 10 could also include other components conventionally found on a phone such as a speaker 16 and keys 21 as shown in FIGS. 3 and 4.

Figure 5:
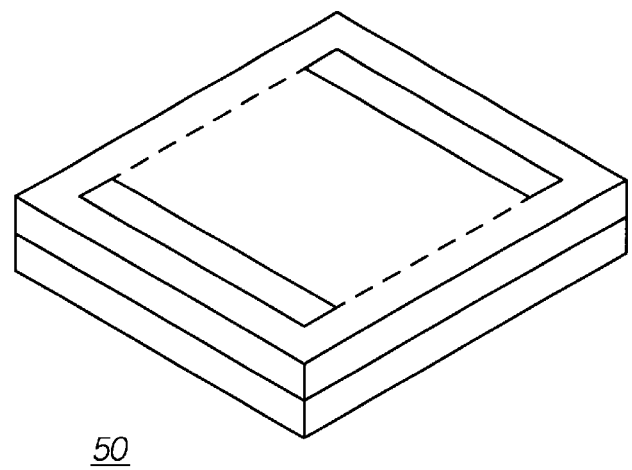
FIG. 5 is a top perspective view of a laptop computer with its flip closed illustrating one of the viewable sides of the liquid crystal display in accordance with the present invention.
Figure 6:
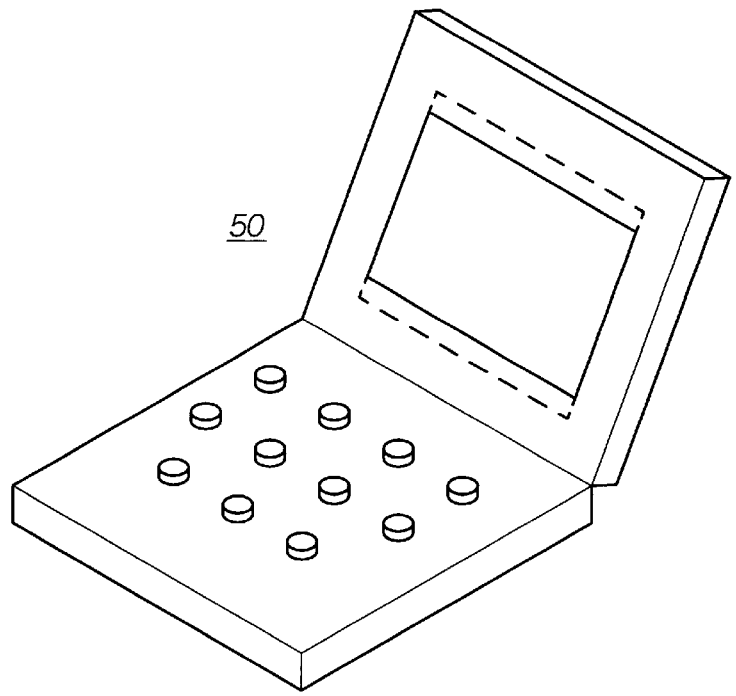
FIG. 6 is another top perspective view of the product of FIG. 5 with its flip opened illustrating an opposing viewable side of the liquid crystal display in accordance with the present invention.
Figure 7:
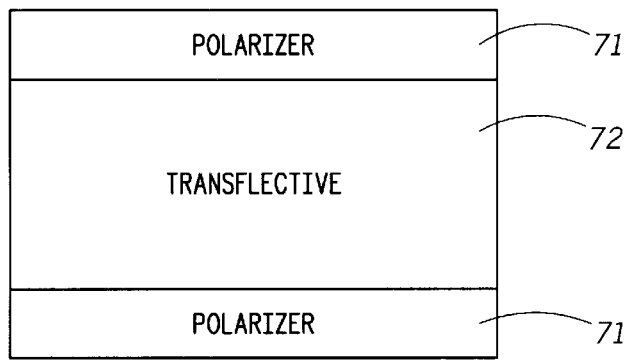
FIG. 7 is a top view of the liquid crystal display portion of the product of FIG. with the flip closed in accordance with the present invention.
Figure 8:
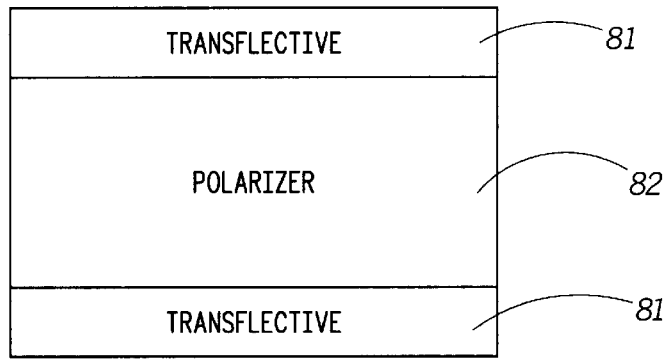
FIG. 8 is a top view of the liquid crystal display portion of the product of FIG. 6 with the flip opened in accordance with the present invention.

FIGS. 5 and 6 illustrate another application in accordance with present invention applied to a computer laptop 50. FIG. 5 shows the laptop with the flip or lid closed and FIG. 6 shows the laptop with the flip open. FIGS. 7 and 8 illustrate top plan views of the opposing sides of the polarizer and transflective film configurations that would correspond to FIGS. 5 and 6. With the lid closed the first viewable area would have a film layer 70 composed of a polarizer film 71 and transflective film 72 as shown in FIG. 7. With the lid open, the side opposing the first viewable area would have a film layer 80 composed of a polarizer film 82 and transflective film 81 as shown in FIG. 8.

Figure 9:
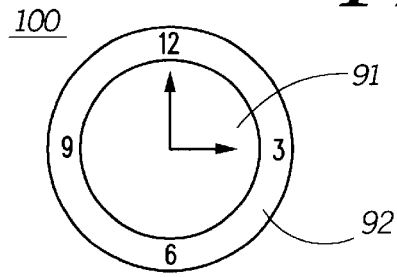
FIGS. 9 and 10 illustrate opposing sides of a clock utilizing a single liquid crystal display in accordance with the present invention.
Figure 11:
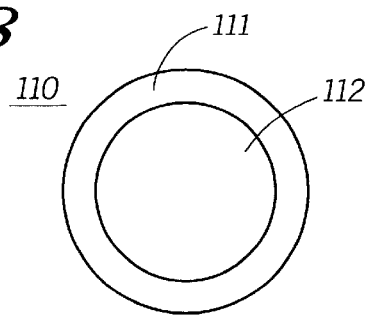
FIGS. 11 and 12 illustrate respective top plan views of the opposing sides of the liquid crystal display of FIGS. 9 and 10 in accordance with the present invention.
Figure 10:
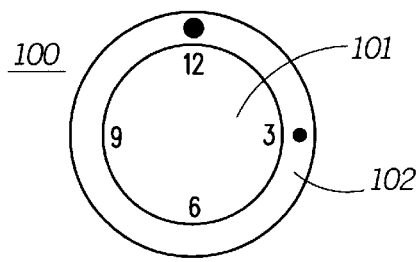
Figure 12:
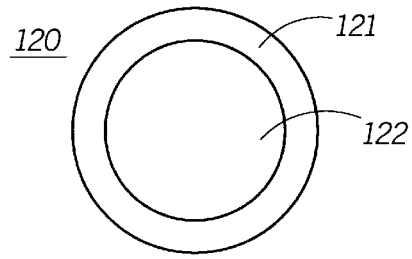

FIGS. 9 and 10 illustrate yet another application in accordance with the present invention as applied to an electronic clock 100. FIG. 9 illustrates a first viewable area utilizing an innermost concentric area 91 to simulate an analog watch with hands. In this instance the outermost concentric area 92 would not display anything or alternatively printed lettering showing the hours can be printed on to the back side of the transflective film. FIG. 10 illustrates another viewable area 102 on the opposing side from the first viewable 91 where area 102 is an outermost concentric area displaying and simulating an analog watch using dots to represent the hours and minutes. In this case, an innermost concentric area 101 would not display anything or have pre-printed lettering showing the hours. FIGS. 11 and 12 illustrate respective top plan views of the underlying film layers for the opposing side of the clock 100 shown in FIGS. 9 and 10. The first viewable area would have a film layer 110 composed of a polarizer film 112 and transflective film 111 as shown in FIG. 11. The side opposing the first viewable area would have a film layer 120 composed of a polarizer film 121 and transflective film 122 as shown in FIG. 12.

The structure of the present invention described above lends itself to a method of generating images on opposing sides of a liquid crystal display. This method would comprise the steps of providing a liquid crystal glass layer and selectively coating portions of a first viewable side of the liquid crystal display glass layer with a polarizer layer and transflective layer. Alternatively, this transflective layer can be replaced with a holographic film layer. Next, the method would comprise the step of selectively coating portions of a second viewable side of the liquid crystal display glass layer with another polarizer layer and another transflective layer, wherein the respective polarizer layers and transflective layers would oppose each other on the opposing sides of the liquid crystal glass layer. Again, the transflective layer on the second viewable side may alternatively be replaced by another holographic film layer. Then, the method is completed by generating images on opposing sides of the liquid crystal display using a liquid crystal display driver. The image on one of the opposing sides can be merely a reformatted subset of the image found on the other opposing side or it may be a completely independent image. The step of generating images can further comprise the step of reformatting the same image for each of the opposing sides wherein viewable areas of the opposing sides are of different dimensions.

The above description is intended by way of example only and is not intended to limit the present invention in any way except as set forth in the following claims.

What is claimed is:

1. A liquid crystal display capable of being viewed from opposing sides, comprising;
    a liquid crystal display glass layer having opposing sides;
    at least a first portion of a first viewable side of the glass layer covered with a polarizer layer and at least a second portion of the first viewable side covered with a transflective layer; and
    at least a first portion of a second viewable side of the glass layer covered with a transflective layer and at least a second portion of the second viewable side covered with a polarizer layer, wherein the polarizer layer of the first viewable side correspondingly opposes the transflective layer of the second viewable side and the transflective layer of the first viewable side correspondingly opposes the polarizer layer of the second viewable side.

2. The liquid crystal display of claim 1, wherein the liquid crystal display glass layer is formed from two separate glass layers.

3. The liquid crystal display of claim 1, wherein the transflective layer and the polarizer layer are film layers.

4. The liquid crystal display of claim 1, wherein a viewable area of the first viewable side and a viewable area of the second viewable side are of different dimensions.

5. The liquid crystal display of claim 1, wherein either the transflective layer on the first viewable side or the second viewable side is replaced with a holographic film layer or a reflective layer.

6. The liquid crystal display of claim 1, wherein the transflective layers on the first viewable side and on the second viewable side are both replaced with respective holographic film layers or respective reflective layers.

7. An electronic device having a liquid crystal display capable of being viewed from opposing sides, comprising:
    a liquid crystal display glass layer selectively coated with a polarizer layer and a transflective layer on portions of a first viewable side of the liquid crystal display glass layer and selectively coated with another polarizer layer and another transflective layer on an opposing second viewable side of the liquid crystal display glass layer, wherein the respective polarizer layers and transflective layers would oppose each other on the opposing sides of the liquid crystal display glass layer; and
    a liquid crystal display driver capable of generating images on opposing sides of the liquid crystal display.

8. The electronic device of claim 7, wherein the electronic device further comprises a second liquid crystal display driver for generating images on one of the opposing sides of the liquid crystal display.

9. The electronic device of claim 7, wherein the electronic device is a cellular phone having the liquid crystal display which is viewable on opposing sides of the cellular phone.

10. The electronic device of claim 7, wherein the electronic device is a cellular phone having the liquid crystal display which is viewable on opposing sides of a flip portion of the cellular phone.

11. The electronic device of claim 7, wherein the electronic device is a personal digital assistant having the liquid crystal display.

12. The electronic device of claim 7, wherein the electronic device is selected among the group consisting of an electronic book, a laptop computer, a cash register, a digital clock, a television, and an electronic game.

13. The liquid crystal display of claim 7, wherein a viewable area of the first viewable side and a viewable area of the second viewable side are of different dimensions.

14. A method of generating images on opposing sides of a liquid crystal display, comprising the steps of:
    providing a liquid crystal glass layer;
    selectively coating portions of a first viewable side of the liquid crystal display glass layer with a polarizer layer and transflective layer;
    selectively coating portions of a second viewable side of the liquid crystal display glass layer with another polarizer layer and another transflective layer, wherein the respective polarizer layers and transflective layers would oppose each other on the opposing sides of the liquid crystal glass layer; and generating images on opposing sides of the liquid crystal display using a liquid crystal display driver.

15. The method of claim 14, wherein the step of generating images further comprises the step of reformatting the same image for each of the opposing sides wherein viewable areas of the opposing sides are of different dimensions.

16. The method of claim 14, wherein the step of generating images further comprises the step of displaying an image on a viewable area of the first viewable side and displaying a reformatted subset of the image a viewable area of the second viewable side.

17. A method of generating images on opposing sides of a liquid crystal display, comprising the steps of:

providing a liquid crystal glass layer;

selectively coating portions of a first viewable side of the liquid crystal display glass layer with a polarizer layer and holographic film layer;

selectively coating portions of a second viewable side of the liquid crystal display glass layer with another polarizer layer and another holographic film layer, wherein the respective polarizer layers and holographic film layers would oppose each other on the opposing sides of the liquid crystal display glass layer; and generating independent images on opposing sides of the liquid crystal display using a single liquid crystal display driver.

18. The method of claim 17, wherein the step of generating images further comprises the step of reformatting the same image for each of the opposing sides wherein viewable areas of the opposing sides are of different dimensions.

19. The method of claim 17, wherein the step of generating images further comprises the step of displaying an image on a viewable area of the first viewable side and displaying a reformatted subset of the image a viewable area of the second viewable side.

* * * * *